Feb. 27, 1934.  A. JOHNSON  1,949,374
HEAT TRANSFER APPARATUS FOR SEMISOLID PRODUCTS
Filed May 17, 1933  2 Sheets-Sheet 1
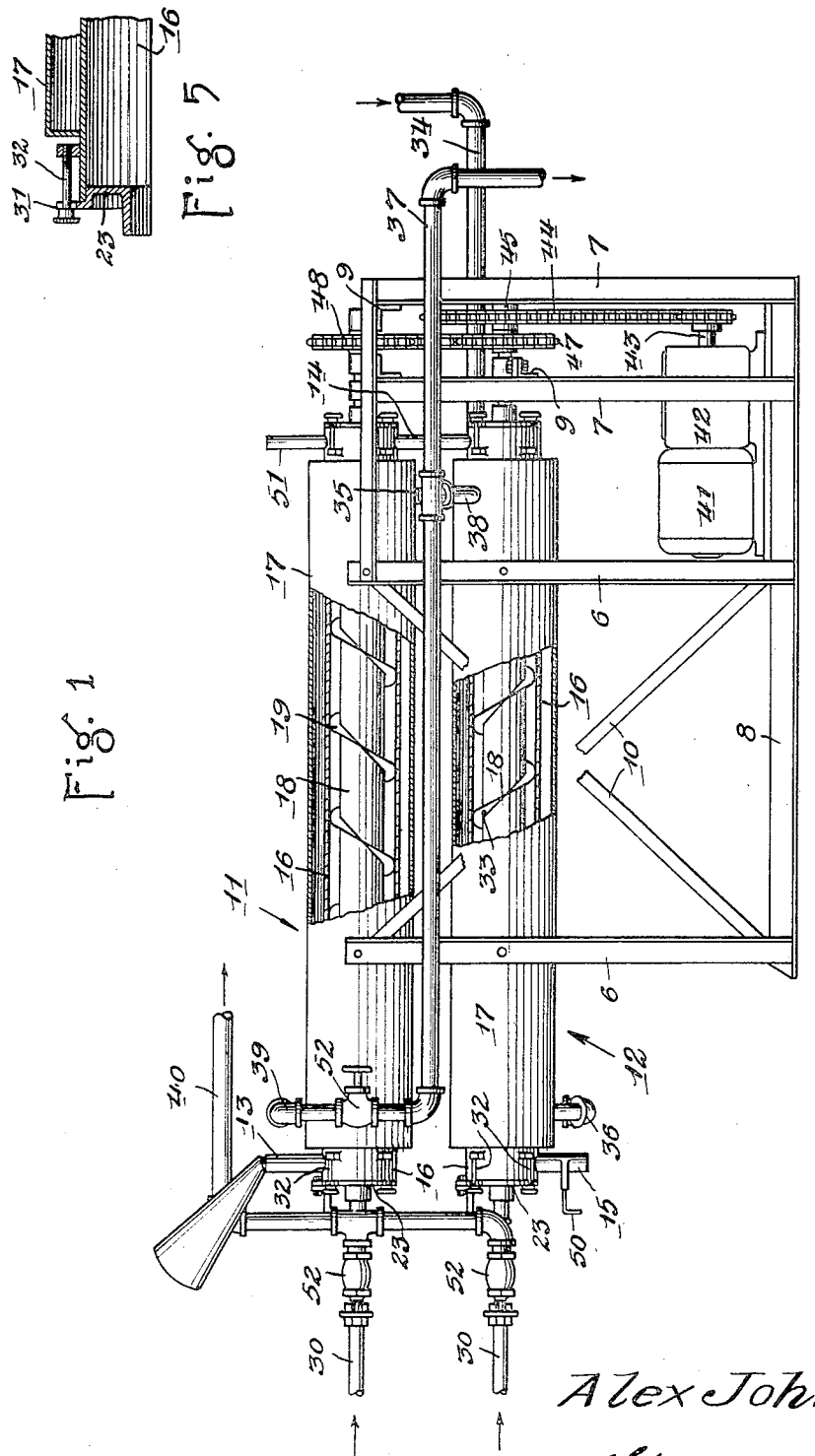
Inventor
Alex Johnson
By Stryker & Stryker
Attorneys Feb. 27, 1934.  A. JOHNSON  1,949,374
HEAT TRANSFER APPARATUS FOR SEMISOLID PRODUCTS
Filed May 17, 1933  2 Sheets-Sheet 2
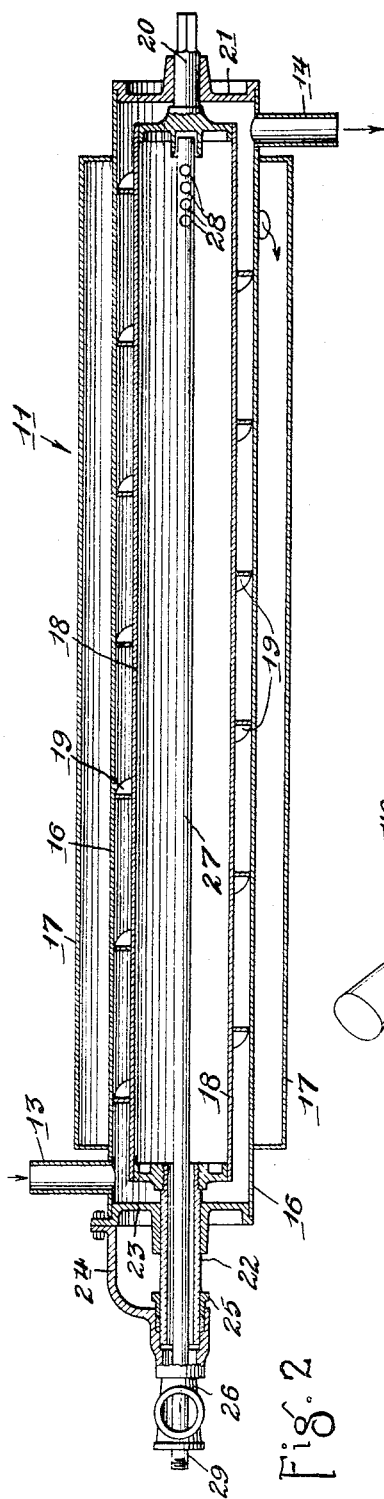
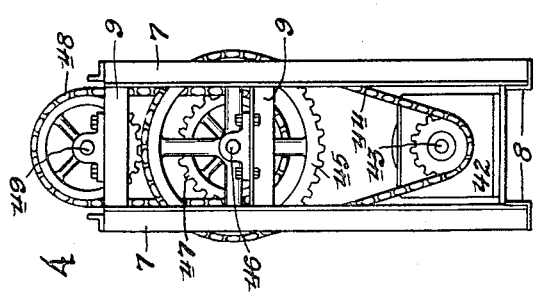
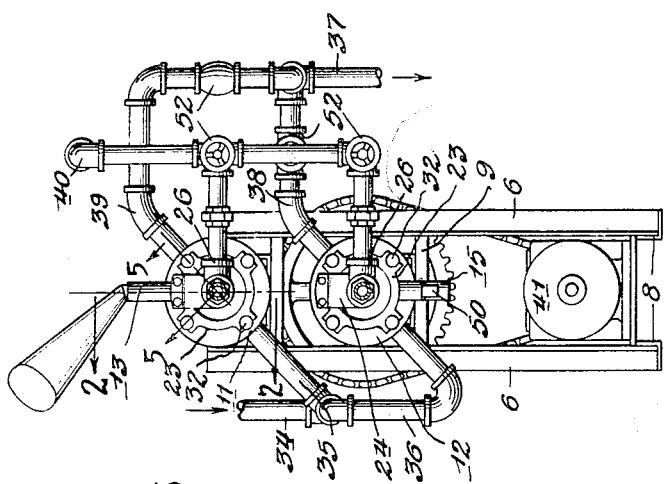
Inventor
Alex Johnson
By Stryker & Stryker
Attorneys Patented Feb. 27, 1934

1,949,374

UNITED STATES PATENT OFFICE

1,949,374

HEAT TRANSFER APPARATUS FOR SEMISOLID PRODUCTS

Alex Johnson, Minneapolis, Minn., assignor to Land O' Lakes Creameries, Inc., Minneapolis, Minn., a corporation of Minnesota Application May 17, 1933. Serial No. 671,500

3 Claims. (Cl. 257—86)

It is an object of this invention to provide a machine for rapidly and continuously cooling or heating semisolid products and particularly, although not exclusively, adapted to cool thick cream and like concentrated products.

Another object is to provide a machine of this class in which the several surfaces coming in contact with the product to be treated may be quickly and easily cleaned and sterilized.

A further object is to provide apparatus of this kind with a novel conveyor whereby the product to be treated is positively advanced along the cooling or heating surfaces and in which the conveyor is so arranged that it continuously removes deposits of the product from the principal cooling or heating surfaces.

Another object is to provide a machine of this class with an attenuated passage for the product to be treated of such length and proportions as to secure increased capacity and a large change of temperature and at the same time to so arrange the mechanism that the machine occupies a relatively small amount of space.

Other objects will appear and be more fully pointed out in the following specification and claims.

Referring to the accompanying drawings which illustrate the best form of my device at present known to me:

Figure 1 is a side elevation of the machine with portions of the outer jackets and casings broken away to show the screw conveyors;

Fig. 2 is a central, longitudinal section through one of the heat transfer units, taken on the line 2—2 of Fig. 3;

Fig. 3 is an end view of the machine as seen from the left of Fig. 1;

Fig. 4 is an end elevation showing the driving mechanism and frame as seen from the right of Fig. 1, and Fig. 5 is a fragmentary, longitudinal section taken on the line 5—5 of Fig. 3.

The machine has a frame of which the principal members comprise a series of upright angle bars 6 and 7 connected by longitudinal bars 8, short cross members 9 and diagonal members 10. Cylindrical units 11 and 12 are mounted one above the other on this frame and are connected together so that the cream or other product to be treated is admitted through an inlet 13, passes longitudinally through the unit 11, down through a pipe 14 and then longitudinally through the unit 12 to an outlet pipe 15. Each of the units has a cylindrical casing 16 enclosed in a jacket 17 for the cooling or heating medium and a cylindrical inner casing 18 spaced slightly from the casing 16 so as to form an attenuated, cylindrical passage for the cream or other product to be treated. A chamber is also provided within the casing 18 for the cooling or heating medium.

Fixed on the exterior of the casing 18, and extending substantially from end to end of said casing, is a helical member 19 constituting a screw conveyor for positively moving a semisolid or thick product from the inlet to the outlet end of the passage. The outer periphery of the member 19 slidably contacts with the cylindrical casing 16 to remove deposits of the product therefrom. An axial shaft 20 projects from the inner casing 18 through a bearing in an end 21 of the unit 11 and has connections, hereinafter described, with a motor for rotating the casing 18 and conveyor member 19. At the opposite end, the casing 18 is supported on an axially disposed pipe 22 extending out through a bearing in a readily removable end cap 23. The pipe 22 has a second bearing in a bracket arm 24 mounted on the cap 23 and fitting the exterior of the pipe 22 is a packing gland 25 adapted to prevent leakage of the heating or cooling medium around the end of that pipe. The open, outer end of the pipe 22 communicates with a fitting 26 which is rigidly supported on the arm 24. The pipe 22 and fitting 26 constitute outlet connections for the heating or cooling medium.

To admit the heating or cooling medium to the interior of the casing 18, a small pipe 27 extends longitudinally through the fitting 26 and pipe 22 into the casing 18 and has a bearing in the end of the casing adjacent to the shaft 20. Outlet openings 28 are formed in the pipe 27 near the latter end. An end 29 of the pipe 27 has a suitable union connecting it to a supply pipe 30 for heating or cooling medium. As best shown in Figs. 3 and 5, the end cap 23 for the casing 16 is formed with lugs 31 which are slotted to receive bolts 32 for removably securing the cap in place, said bolts being threaded in lugs welded to the exterior of the casing 16.

The unit 12 is generally similar to the unit 11 but has a screw conveyor member 33 which is wound on the inner casing 18 of the unit 12 in the reverse direction from the member 13 so that it advances the product to be treated toward the outlet pipe 15 when rotated in the same direction as the member 13.

To supply the jackets 17 of the units 11 or 12 with heating or cooling medium, a main supply pipe 34 (Figs. 1 and 3) has a branch 35 communicating with the jacket 17 for unit 11 and a branch 36 communicating with the jacket 17 for unit 12. The outlet connections for the casings 17 comprise a main pipe 37 having a branch 38 connected to the unit 12 and a branch 39 for the unit 11. As hereinbefore indicated, the pipes 30 supply heating or cooling medium to the interior of the casings 18 through pipes 27. The outlets for the casings 18 comprise the fittings 26 severally connected to branches of a pipe 40, as best shown in Fig. 3.

A pipe 51 extends upward from the casing 16 in axial alignment with the pipe 14 to allow access to the latter for cleaning and to constitute a vent. The outlet pipe 15 is provided with a slide valve or closure 50 to control the rate of discharge of the product. Valves 52 are severally located in the outlet pipes to permit control of the rate of flow of the heating or cooling medium through the jackets 17 and inner casings 18.

For operating the screw conveyors, an electric motor 41 is connected, through suitable speed-reducing gears in a casing 42 and shaft 43, to a main drive chain 44. A large sprocket wheel 45 is driven by the chain 44 and is fixed on a shaft 46 having suitable bearings supported on the cross members 8 of the frame. The shaft 46 is operatively connected to the shaft 20 for the unit 12 and a second sprocket wheel 47 is fixed on the shaft 46 to drive a chain 48 connected by a sprocket wheel to a shaft 49. Shaft 20 of the unit 11 is coupled in end to end relation to the shaft 49 for rotating the casing 18 carrying the conveyor member 19.

The machine is primarily, although not exclusively, adapted for use in cooling large quantities of cream after the pasteurization of the same and preparatory to churning in large creameries. During such use of the machine the hot cream is fed into the intake pipe 13 and is discharged in cool and relatively thick, or semi-solid, condition from the outlet pipe 15 under control of the closure 50. By the mechanism hereinbefore described, cooling liquid is circulated in the jackets 17 and also in the inner casings 18 constituting the screw conveyor support. The conveyor members 19 and 33 are continuously rotated, together with the casings 18, by the power-driven connections and motor 41. The direction of rotation of the members 19 and 33 is such that the cream is positively transmitted in the attenuated passages formed between the inner casings 18 and the outer casings 16 from the inlet pipe 13 to the outlet pipe 14 of the unit 11 and then from the latter pipe to the outlet pipe 15 of the unit 12.

It has been found that a high degree of efficiency is obtained with this apparatus and that a rapid change in temperature takes place in the product notwithstanding the rapid flow and large capacity of the machine. The machine may be shut down periodically for cleaning and this operation is accomplished quickly and easily because the parts of the interior requiring cleaning are all accessible after removing the bolts 32 and unions connecting the fittings 26 to branches of the pipe 40 and those connecting the pipes 27 to the pipes 30. The end caps 23 are thus removable together with the inner casings 18 and screw conveyors 19 and 33.

Having described my invention, what I claim as new and desire to protect by Letters Patent is:

1. In a machine of the class described, outer and inner cylindrical casings having an attenuated, cylindrical space between them for the product to be treated, end caps on said outer casing formed with journal bearings for said inner casing, coaxial members projecting from said inner casing and revolubly fitting in said bearings one of said coaxial members being a solid drive shaft and the other being a conduit communicating with said inner casing, means for admitting the product to be treated near one end of said space, an outlet for said product near the opposite end of said space, a jacket on the exterior of said outer casing for a heating or cooling medium, a chamber within said inner casing for the said medium, a helical conveyor mounted on said inner casing in said space between said outer and inner casings for actuating the material to be treated longitudinally of said space, power-driven means for rotating said inner casing operatively connected to said drive shaft, said shaft being freely removable from said driving means to the interior of said outer casing and readily removable means for securing to the outer casing the end cap having the bearing for said conduit, said inner casing, conveyor and coaxial members being removable as a unit to permit ready access to the interior of said outer casing.

2. In a machine of the class described, outer and inner cylindrical casings having an attenuated, cylindrical space between them for the product to be treated, end caps on said outer casing formed with journal bearings for said inner casing, coaxial members projecting from said inner casing and revolubly fitting in said bearings, one of said members being a solid drive shaft, an inlet and an outlet for the product to be treated communicating with said space, means for applying a heating or cooling medium to the outer surface of said outer casing, a screw conveyor mounted in the space between said outer and inner casings for actuating the material to be treated longitudinally of said space and power-driven means for rotating said conveyor said means having a freely removable connection with said drive shaft and one of said end caps and said inner casing, shaft and conveyor being readily removable from said power-driven means and outer casing for cleaning.

3. A cream cooler having in combination outer and inner cylindrical casings, the ends of said outer casing being formed with journal bearings for said inner casing and one of said ends comprising a removable cap, a solid drive shaft projecting from said inner casing through one of said bearings, a conduit projecting from said inner casing through said removable cap, a pipe extending axially within said inner casing and projecting through said conduit, an attenuated, cylindrical space being formed between said casings for the cream to be cooled, a screw conveyor fixed on said inner casing and revolubly fitting the inner surface of said outer casing, a pipe fitting supported on said removable cap and having a bearing for said conduit in spaced relation to said cap, means for supplying cooling fluid to the end of said pipe adjacent to said fitting, an outlet for said fluid connected to said fitting, power-driven mechanism removably connected to said shaft and means removably securing said cap on said outer casing to permit the ready removal of said inner casing, shaft, conduit, fitting and conveyor from said outer casing.

ALEX JOHNSON.